(12) United States Patent  
Liang

(10) Patent No.: US 6,439,590 B1
(45) Date of Patent: Aug. 27, 2002

(54) STANDING-PEDALING BIKE

(76) Inventor: Fa-Kuang Liang, P.O. Box 96-405, Taipei 106 (TW)

( * ) Notice: Subject to any disclaimer, the term of this patent is extended or adjusted under 35 U.S.C. 154(b) by 0 days.

(21) Appl. No.: 09/809,734

(22) Filed: Mar. 13, 2001

(51) Int. Cl.[7] .............................. B62M 1/00; B62K 9/00
(52) U.S. Cl. ..................................... 280/221; 280/288.1
(58) Field of Search ................................. 280/220, 221, 280/259–261, 288.1, 252, 256, 11.115

(56) References Cited

U.S. PATENT DOCUMENTS

| | | | | |
|---|---|---|---|---|
| 1,653,889 A | * | 12/1927 | Clark | 280/221 |
| 1,800,123 A | * | 4/1931 | Wagen | 280/221 |
| 2,118,640 A | * | 5/1938 | Bergen | 280/221 |
| 2,723,131 A | * | 11/1955 | McChesney, Jr. | 280/221 |
| 4,826,190 A | * | 5/1989 | Hartmann | 280/260 |
| 4,828,284 A | * | 5/1989 | Sandgren | 280/221 |
| 5,192,089 A | * | 3/1993 | Taylor | 280/221 |
| 5,224,724 A | * | 7/1993 | Greenwood | 280/221 |
| 5,470,089 A | * | 11/1995 | Whitson et al. | 280/264 |
| 5,672,133 A | * | 9/1997 | Eden | 280/261 |
| 5,702,274 A | * | 12/1997 | White | 440/21 |
| 5,895,065 A | * | 4/1999 | Khomo | 280/221 |
| 5,964,472 A | * | 10/1999 | Smith et al. | 280/259 |

* cited by examiner

*Primary Examiner*—Paul N. Dickson
*Assistant Examiner*—Matthew Luby

(57) ABSTRACT

A standing-pedaling bike, which comprises a bike frame and a spindle; both sides of the spindle are mounted with two cranks respectively; the end of every crank is mounted with a pedal shaft, and each pedal shaft is mounted with a roller; the rear ends of fork frame are furnished with two fixed shafts respectively, which are to connect with two shaft sleeves on ends of the pedal plates respectively; the bottom side of every pedal plate is furnished a guide channel to be fitted on the roller of the pedal shaft; the fixed shafts on rear end of the fork frame are used as pivotal shafts respectively; after the elongate pedal plates are pedaled, a pressure will drive the rollers on the pedal shafts to move along the guide channel, and the cranks will move circularly to drive the gear wheel, the chain and the rear wheel to move so as to provide a pleasure of exercise.

4 Claims, 7 Drawing Sheets

STANDING-PEDALING BIKE

BACKGROUND OF THE INVENTION

1. Field of the Invention

This invention relates to a bike, and particularly to a standing-pedaling bike.

2. Description of the Prior Art

Most of the conventional bikes are usually used as transportation equipment by riding thereon.

In a conventional two-wheel transportation equipment, the spindle of the rear wheel of a bike is in an eccentric shape; when a user rides to go forwards, the rear end of the bike would swing, i.e., being similar to riding on a horse.

In a conventional two-wheel transportation equipment, the frame between two wheels is a flat plate, being close to the ground surface; the user can put one foot on the flat plate, while the other foot can put on the ground as a driving means so as to provide an exercise and riding function.

SUMMARY OF THE INVENTION

The prime object of the present invention is to provide a standing-pedaling bike, in which the pedal shafts on two cranks on both sides of the bike frame are mounted with two rollers respectively; the rear end of the fork frame is furnished with fixed shafts to be mounted with shaft sleeves of the pedal plates respectively so as to form into two swinging shafts of the pedal plates; the pedal plates each have a wide surface to facilitate pedaling; when the cranks turn, the pedal plates will swing up and down so as to let a user ride thereon.

Another object of the present invention is to provide a standing pedaling bike, in which both sides of the fork frame are furnished with two fixed shafts for supporting the pedal plates in pivotal connection so as to provide a fulcrum upon the pedal plates swinging; the other ends of the two pedal plates are in contact with the pedal shafts on the outer ends of the cranks respectively. When the pedal plates are pedaled, the pedal shafts will move circularly so as to have the pedal plates each had a swinging end; when a user stands and rides on the bike, the bike will move forwards.

Still another object of the present invention is to provide a standing-pedaling bike, in which two pedal plates are mounted between the two fixed shafts on both sides of the fork frame and the two pedal shafts respectively; two ends of the pedal plates are furnished with two shaft sleeves to be mounted on two fixed shafts on both sides of the fork frame, and the fixed shafts are used as rotary fulcrum, while the other ends of every pedal plate has a guide channel to be mounted on a roller mounted on a pedal shaft on outer end of a crank; when the pedal plate is pedaled to swing up and down, the guide channel under the pedal plate will guide the roller on the pedal shaft to slide and move in the guide channel.

A further object of the present invention is to provide a standing-pedaling bike, in which two pedal plates are mounted between two fixed shafts on both sides of the fork frame and the pedal shafts respectively; two ends of the pedal plates have shaft sleeves respectively to be mounted on two fixed shafts on both sides of the fork frame; the fixed shafts are used as rotary fulcrums thereof, while the other end of each pedal plate has an elongate guide channel underneath for receiving a roller; when the pedal plate is pedaled to move circularly, the elongate guide channel will guide the roller on the pedal shaft to move.

A still further object of the present invention is to provide a standing-pedaling bike, in which two pedal plates are mounted between two fixed shafts on both sides of the fork frame and the pedal shafts; two ends of the two pedal plates are mounted on two pedal shafts respectively, while the other end of each pedal plate is furnished with an elongate guide channel underneath; the two elongate guide channels are used for receiving two fixed shafts on both sides of the fork frame. When the pedal plates are pedaled to move circularly, one end of each pedal plate will move circularly, while the other end having an elongate guide channel will cause the pedal plate to slide and move along the fixed shaft on both sides of the fork frame.

Yet another object of the present invention is to provide a standing-pedaling bike, in which two pedal plates are mounted between the two fixed shafts on both sides of the fork frame and the pedal shafts; one end each pedal plate is mounted on a pedal shaft, while the other end is connected with a swinging link; the other end of the swinging link is connected with the fork frame. When the pedal plate is pedaled to move circularly, one end of the pedal plate will move circularly, while the swinging link on the other end will swing upon the pedal plate moving.

DETAILED DESCRIPTION OF THE PREFERRED EMBODIMENT

Figure 1:
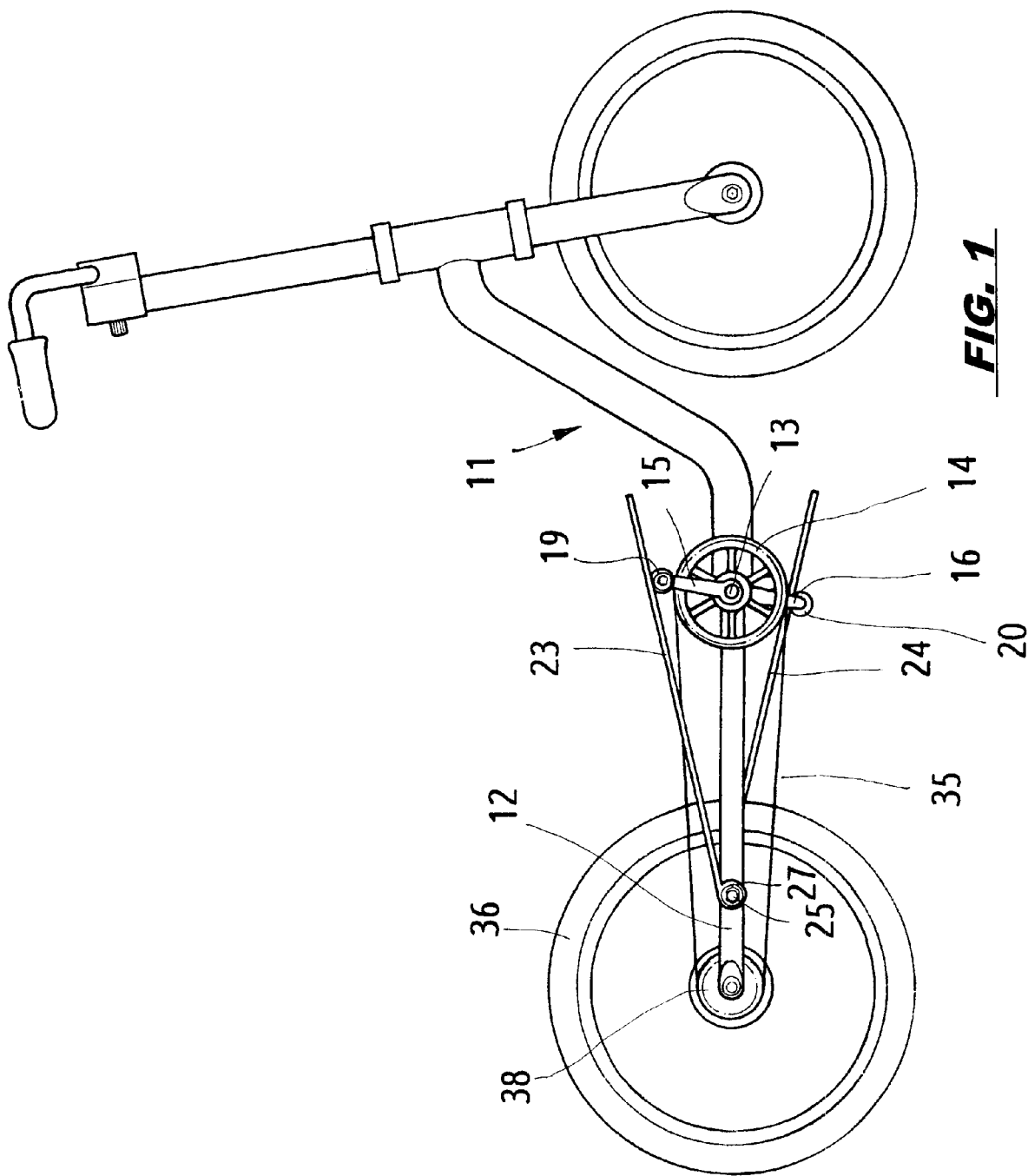
FIG. 1 is a plan view of the present invention, showing the pedal structure of the bike.
Figure 2:
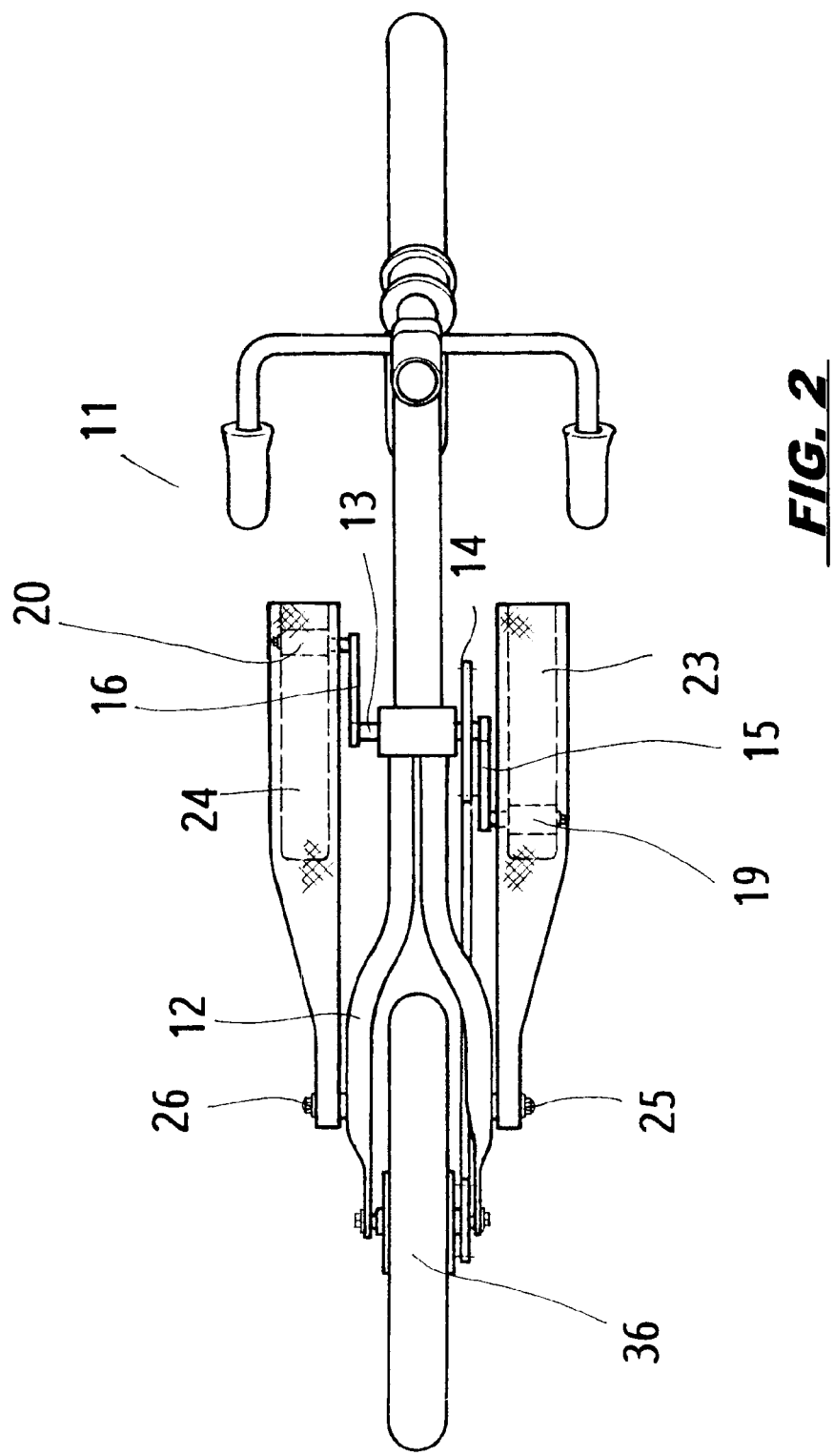
FIG. 2 is a top view of the present invention.
Figure 3:
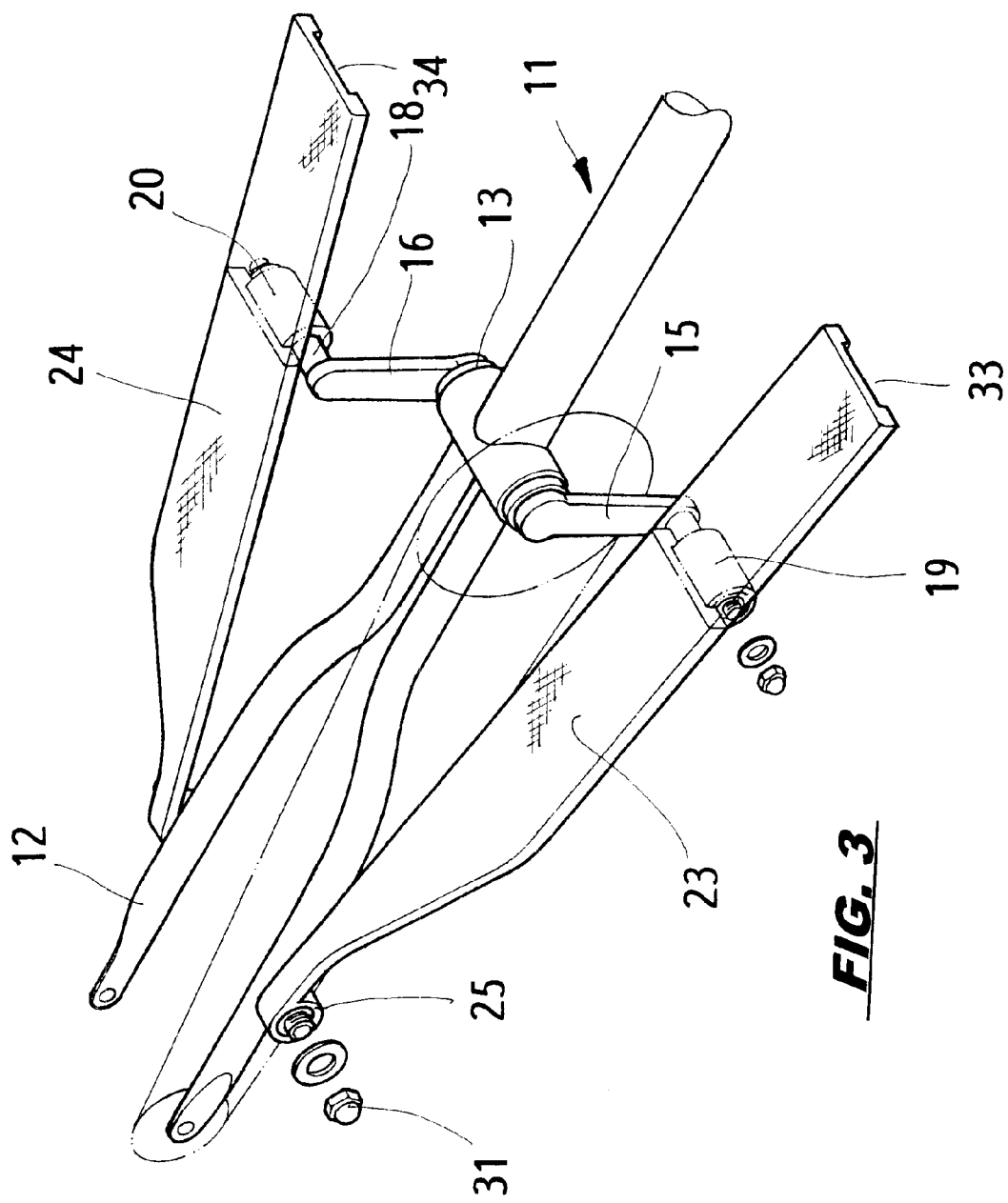
FIG. 3 is a fragmental sectional view of the present invention, showing the structure relation between the pedal and the bike frame.
Figure 4:
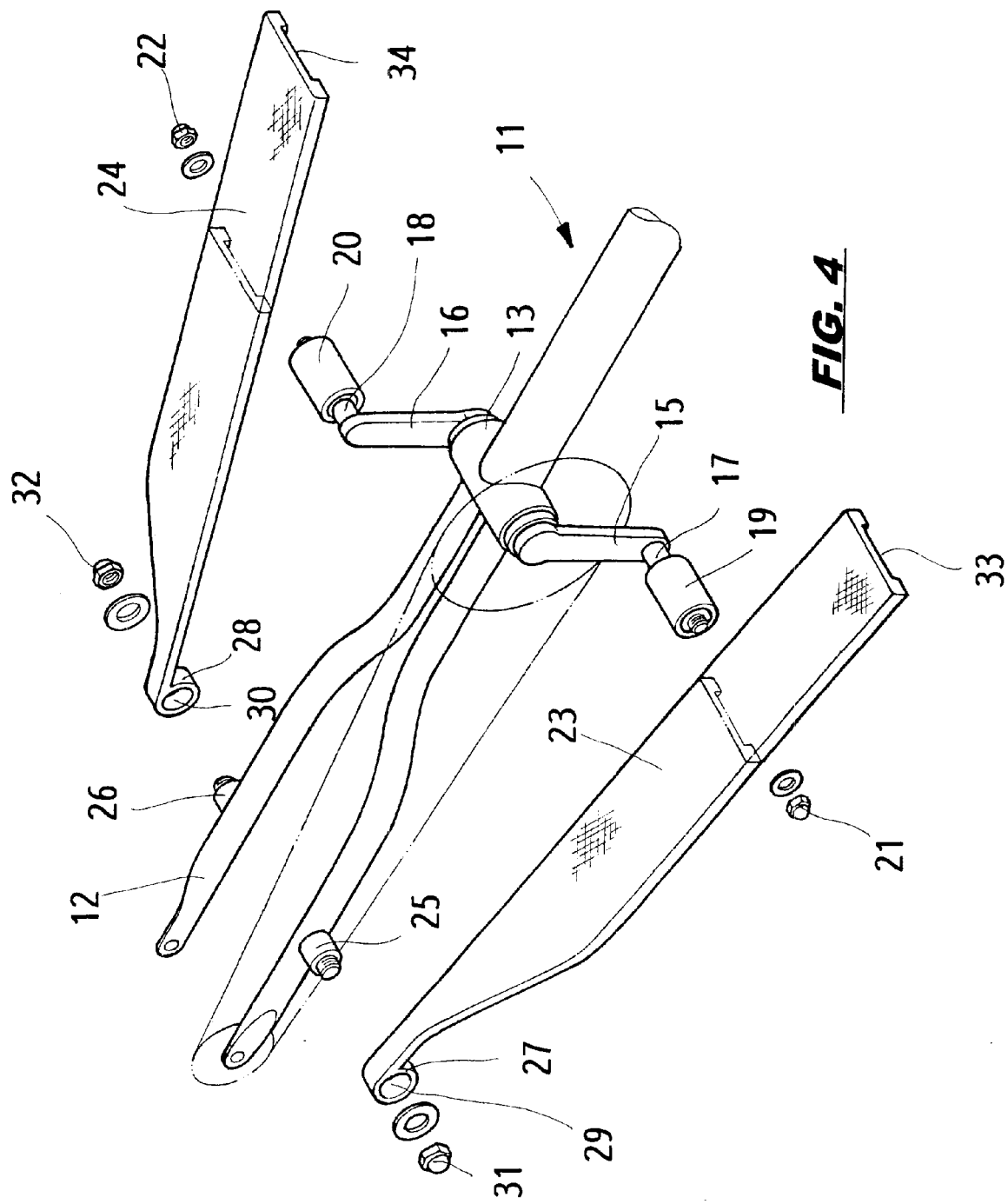
FIG. 4 is a disassembled view of the present invention, showing the structure relation between the pedal plate and the bike frame.

This invention relates to a standing-pedaling bike; as shown in FIGS. 1 to 4, a spindle 13 is furnished between the bike frame 11 and the fork frame 12; both ends of the spindle 13 are mounted with cranks 15 and 16 respectively. The tail ends of the cranks 15 and 16 are mounted with two pedal shafts 17 and 18 respectively. The crank 15 on one side of the spindle 13 is mounted with a gear wheel 14, on which a chain 35 is mounted for coupling with a ratchet wheel 38. When the pedal shafts 17 and 18 are pedaled by feet, the chain 35 will drive the ratchet wheel 38 to rotate, and the rear wheel 36 will turn to move forwards.

The assembly including cranks 15 and 16 and the pedal shafts 17 and 18 on both sides of the spindle 13 on the bike frame 11 can provide a user with the same parts for pedaling away by standing on the bike; however, the pedal shafts 17 and 18 on the cranks 15 and 16 are mounted with two rollers 19 and 20 respectively, which have a given diameter and width. The outer ends of the pedal shafts 17 and 18 are mounted with washers and two nuts 21 and 22 respectively to prevent the rollers 19 and 20 from separating from the pedal shafts 17 and 18 unintentionally.

The rollers 19 and 20 of the pedal shafts 17 and 18 on the outer ends of the cranks 15 and 16 are mounted with two pedal plates 23 and 24 respectively. Both sides of the fork frame 12 are mounted, by means of welding, with two fixed shafts 25 and 26 respectively to facilitate the shaft holes 29 and 30 of the shaft sleeves 27 and 28 to mount on ends of the pedal plates 23 and 24 respectively. The outer ends of the fixed shafts 25 and 26 are furnished with threads respectively; after the pedal plates 23 and 24 are mounted with two shaft sleeves 27 and 28 respectively, washers and two nuts 31 and 32 are fixed in place so as to have one end of the two pedal plates 23 and 24 mounted on the fixed shafts 25 and 26 on both sides of the fork frame, and to prevent the pedal plates 23 and 24 from separation.

The shaft sleeves 27 and 28 on ends of the pedal plates 23 and 24 are to be mounted on the fixed shafts 25 and 26 on both sides of the fork frame 12 respectively; then, washers and nuts 31 and 32 are mounted thereto respectively so as to prevent the pedal plates 23 and 24 from separating from the fixed shafts 25 and 26 of the fork frame 12; the shaft sleeves 27 and 28 on ends of the pedal plates 23 and 24 have two shaft holes 29 and 30 respectively to be mounted on the fixed shafts 25 and 26 so as to have a pivotal connection between them. The fixed shafts 25 and 26 form the fulcrums of the two pedal plates 23 and 24 respectively upon swinging so as to have the rollers 19 and 20 on the outer ends of the cranks 15 and 15 turned upon pedaling, i.e., the pedal plates can swing up and down. In that case, one end of every the pedal plate 23 or 24 on the roller 19 or 20 can turn around the fixed shaft 25 or 26 of the fork frame 12. When a user's foot pedals on the pedal plate 23 and 24, a pressure will be applied to a roller 19 or 20 on the crank 15 or 16 to cause a pedal shaft 17 and 18 to move circularly. The length of every roller 19 or 20 is designed to fit the width of the guide channel 33 or 34 beneath the pedal plate 23 or 24; the guide channel can provide a guide and shift function, and also can prevent the pedal plate 23 or 24 from shifting laterally. After the rollers 19 and 20 of the pedal shafts 17 and 18 are assembled together with the guide channels 33 and 34 and the pedal plates 23 and 24 respectively, they are in rolling contact with each other so as to minimize the friction resistance between the pedal plates 23 and 24 and the rollers 19 and 20.

The pedal plates 23 and 24 mounted on the rollers 19 and 20 are flat plates having a given width; the pedal plates are designed to carry a user's feet and the surface of the pedal plates is furnished with sliding-proof threads, or glued with a sliding-proof piece so as to provide a given friction upon pedaling.

As soon as a user's one foot is put on a pedal plate at a higher position, a given weight will be applied to the pedal plate; in that case, the roller under the pedal plate will roll along the guide channel to cause the pedal shaft to move forwards circularly so as to drive the gear wheel, the chain 35 and the rear wheel 36 to move forwards.

The pedal plates 23 and 24 are mounted on both sides of the fork frame 12 and on the cranks 15 and 16 respectively by means of shaft sleeves 27 and 28 furnished on ends of the pedal plates respectively as shown in FIGS. 1 to 4; the shaft sleeves have shaft holes 29 and 30 respectively to facilitate the shaft sleeves to mount on the fixed shafts 25 and 26 on both sides of the fork frame 12 so as to enable the pedal plates 23 and 24 to swing up and down; then, the guide channels 33 and 34 in close contact with the rollers 19 and 20 underneath enable the cranks 15 and 16 to move circularly upon pedaling.

Figure 5:
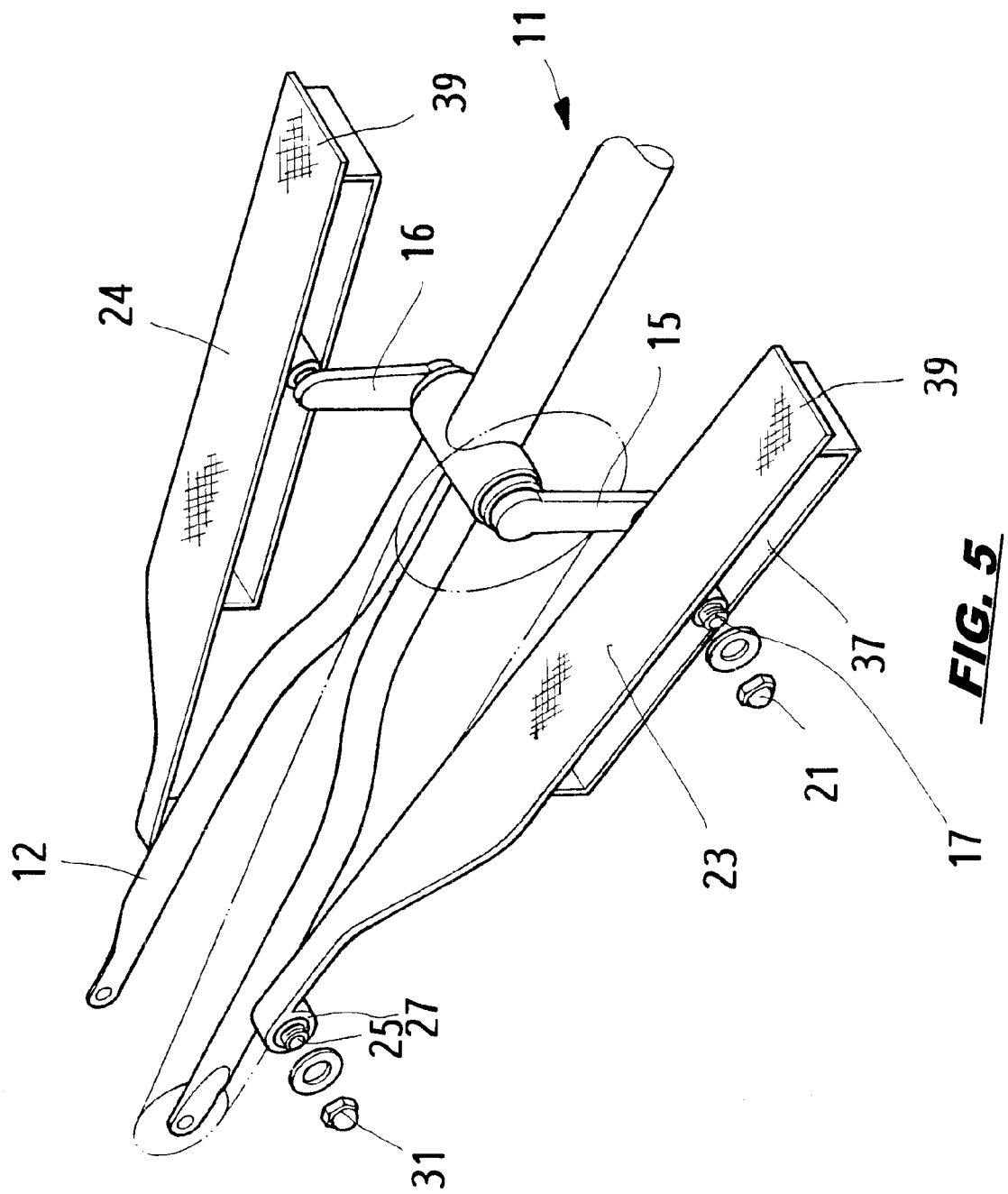
FIG. 5 is a fragmental perspective view of the present invention, showing the second embodiment of structure between the pedals and the bike frame.

FIG. 5 shows the second embodiment of the present invention in which both sides of the fork frame 12 same as the aforesaid embodiment are furnished with two fixed shafts 25 and 26 respectively; the shaft sleeves 27 and 28 on ends of the two pedal plates 23 and 24 are to be mounted on the fixed shafts 25 and 26 respectively so as to enable the pedal plates 23 and 24 to swing. The pedal shafts 17 and 18 on outer ends of the cranks 15 and 16 are mounted with rollers 19 and 20 same as the aforesaid embodiment; however, the contact surface between the pedal shafts 17 and 18 and the rollers 19 and 20 are furnished with two guide plates 39 respectively; the elongate sliding channels 37 formed with the guide plate 39 are used for receiving the rollers 19 and 20 respectively so as to enable the rollers 19 and 20 to move circularly; the elongate sliding channels 37 and the rollers 19 and 20 are formed into coupling assembly respectively so as to limit the pedal plates 23 and 24 from swinging upwards too high.

Figure 6:
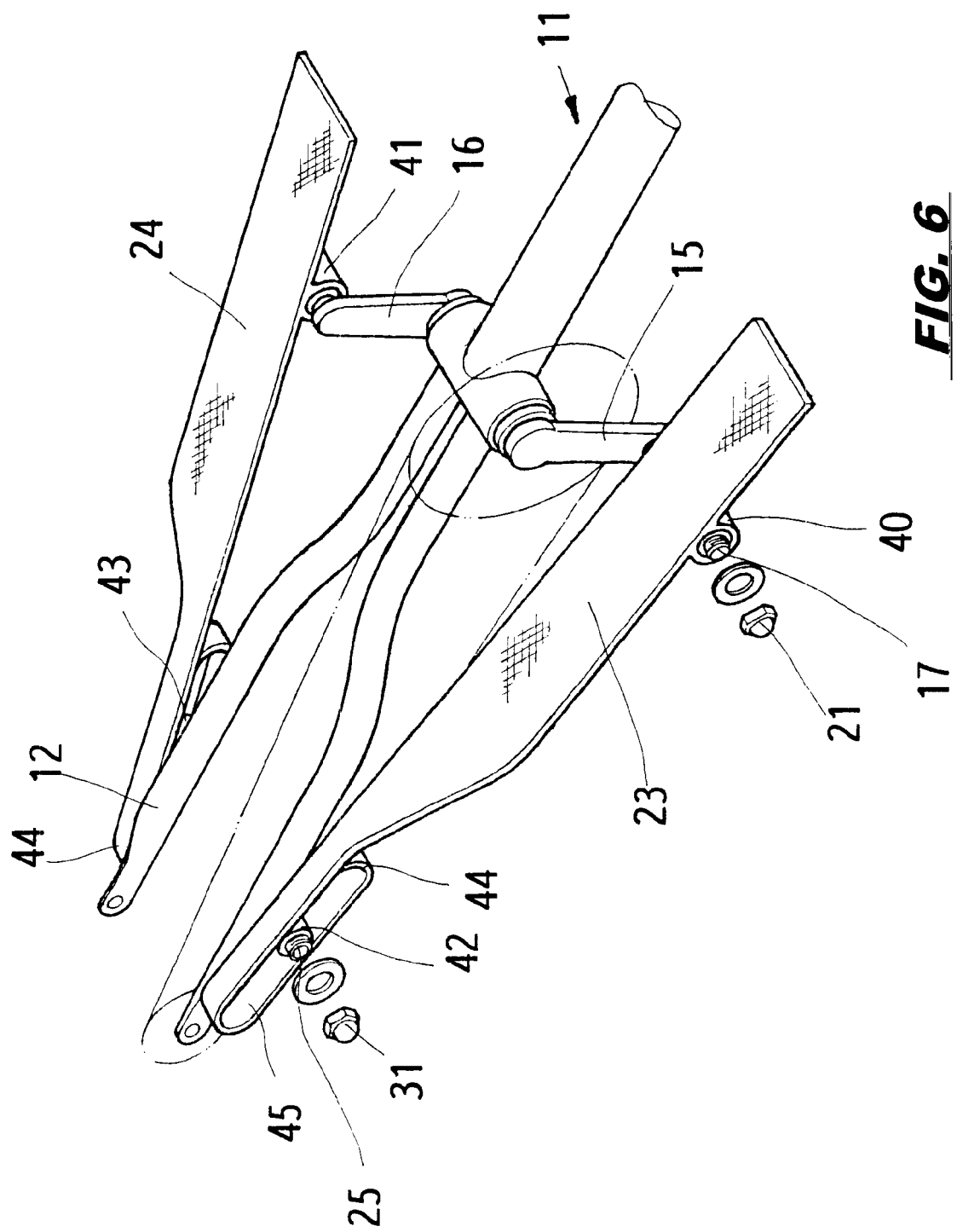
FIG. 6 is a fragmental perspective view of the present invention, showing the third embodiment of structure between the pedals and the bike frame.

FIG. 6 shows the third embodiment of the present invention, in which the bottom sides of the pedal plates 23 and 24 are furnished with shaft sleeves 40 and 41 respectively, which are mounted on the pedal shafts 17 and 18 on the outer ends of the cranks 15 and 16. The other ends of the pedal plates 23 and 24 are furnished with two elongate sliding channels 45 respectively to be mounted on two rollers 42 and 43 of two fixed shafts 25 and 26 on both sides of the fork frame 12; then, washers and nuts 31 and 32 are mounted to the fixed shafts 25 and 26 respectively to keep the pedal plates in place. When a user's feet pedal on the pedal plates 23 and 24, the shaft sleeves 40 and 41 under the pedal plates 23 and 24 will drive the cranks 15 and 16 to move circular by under the limit and guide of the elongate sliding channels on ends of the pedal plates 23 and 24 and the rollers 42 and 43.

Figure 7:
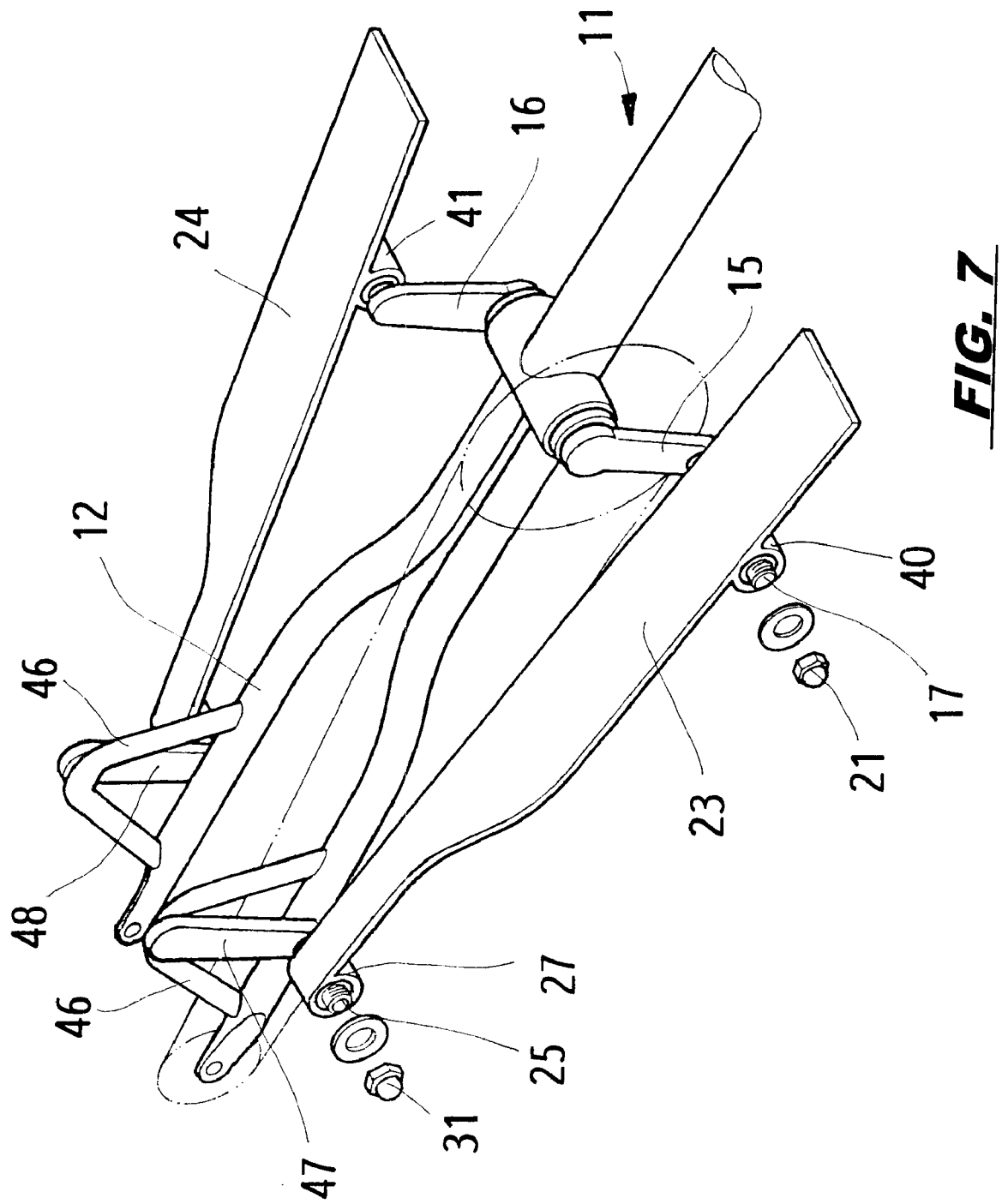
FIG. 7 is a fragmental perspective view of the present invention, showing the fourth embodiment of structure between the pedals and the bike frame.

FIG. 7 shows the fourth embodiment of the present invention, in which the bottom sides of the pedal plates 23 and 24 are furnished with two shaft sleeves 40 and 41 respectively, which are mounted on the pedal shafts 17 and 18 on the outer ends of the cranks 15 and 16 respectively. The other ends of the pedal plates 23 and 24 are furnished with two shaft sleeves 27 and 28 to be mounted on two fixed shafts 25 and 26 on the lower side of two swinging links 47 and 48 respectively, and such shaft sleeves are fastened in place by means of washers and nuts respectively; the other ends of the swinging links 47 and 48 are pivotally connected with the prop frames 46 respectively. The swinging links 47 and 48 are pivotally mounted on the center of the prop frames respectively. When the pedal plates 23 and 24 are pedaled, the pedal shafts 17 and 18 of the cranks 15 and 16 will be driven to move circularly; simultaneously, the fixed shafts 25 and 26 on the other ends of the pedal plates 23 and 24 will pull the swinging links 47 and 48 to swing without affecting the circular move of the pedal shafts 17 and 18; a person can stand on the pedal plates 23 and 24 to pedal and move forwards.

The aforesaid embodiments of the present invention have disclosed the features and structures completely. The fixed shafts on the rear part of the fork frame are used as prop and rotary shafts; after the pedal plates are pedaled, the pedal shafts will move circularly to drive the gear wheel, the chain and the rear wheel to move forwards so as to provide a fun of exercise; it is apparent that the present invention has provided obvious improvement which is never anticipated and achieved by any person in the field, and the structure of the present invention is deemed unique.

What is claimed is:

1. A standing-pedaling bike, comprising a bike frame, a spindle having two cranks mounted at both ends of the spindle, respectively, the outer end of each said crank being mounted with a pedal shaft, the rear end of the bike frame including a forked frame to which both ends are furnished with a fixed shaft, and further including:

said pedal shafts are each mounted with a roller; a pedal plate mounted between each roller and fixed shaft; each of said pedal plates having a shaft sleeve with a shaft hole for mounting on the fixed shaft so as to form the pedal plates into a swinging structure; nuts for fastening the shaft sleeves and the fixed shafts; each of said pedal plates has a front end which has a wider surface than the rear end; each of said pedal plates has a bottom side that is mounted on the respective roller of said pedal shafts; said pedal plates having a stop surface for receiving a pedal force in order to move the pedal plate up and down; said cranks moving circularly to drive a gear wheel, a chain and a rear wheel to move the bike forwardly whereby a user can stand on the pedal plates to ride said bike.

2. A standing-pedaling bike as claimed in claim 1, wherein the bottom side of said wider part of each said pedal plate is in contact with one of said rollers mounted on said pedal shafts whereby the pedal plate includes a recess channel having surface in contact with said rollers for providing a contacting and guiding function.

3. A standing-pedaling bike as claimed in claim 1, wherein one end of each of said pedals is furnished with a wide surface mounted on each of said pedal shafts and the top surface of each of said pedal plates is furnished with sliding-proof threads or a sliding-proof piece.

4. A standing-pedaling bike as claimed in claim 1, wherein an outer end of each of said pedal plates having said wider surface is mounted with a guide plate having an elongate sliding channel which is mounted over said roller of said pedal shaft for limiting and preventing said pedal plates and said pedal shaft from separating.

\* \* \* \* \*